Patented June 10, 1947

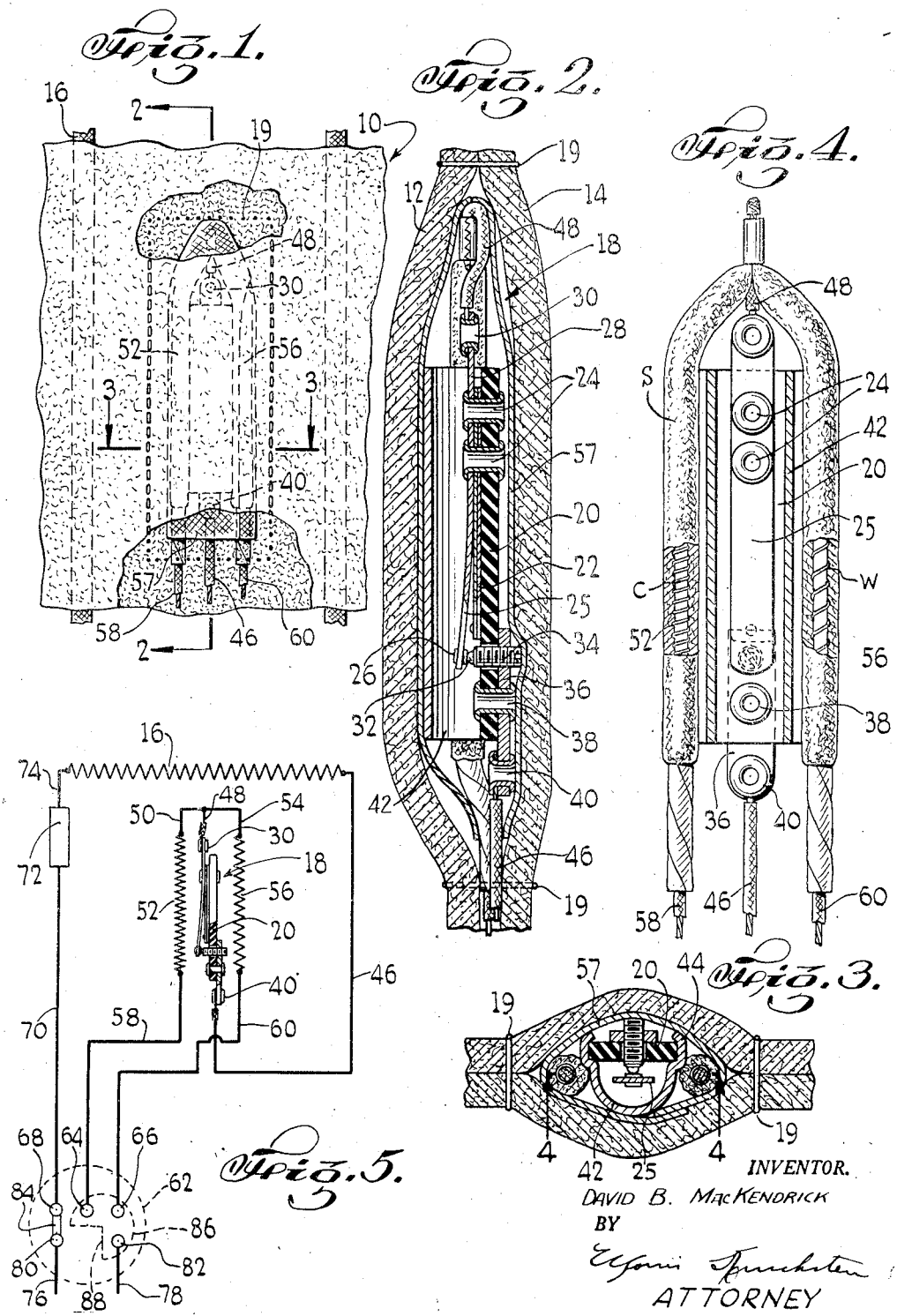

2,421,953

UNITED STATES PATENT OFFICE 2,421,953

ELECTRIC HEATING PAD CONTROL

David B. MacKendrick, New York, N. Y.

Application October 23, 1944, Serial No. 559,901

2 Claims. (Cl. 219—46)

This invention relates to electric heating devices, such, for instance, as electric heating pads, which provide several different degrees of heat.

Heretofore, it has been customary to furnish devices of this character with a plurality of heating coils. For example, two coils, one of high and one of low resistance commonly were used. When connected across line, the high resistance coil furnished low heat; the low resistance coil, medium heat; and both coils, in parallel, high heat. Obviously, the two coils required two types of resistance material and/or two distinct or different winding operations. These devices had two thermostats, both set at the temperature for high heat prescribed by the Underwriters' Laboratories, Inc.

Multi-heat devices of the character described also have been made in which a single, intermittently energized, heating coil was employed, said coil being optionally connected in series with any one of three thermostats set at different temperatures. This construction required, in addition, a fourth thermostat set at high heat and prescribed, for safety, by the Underwriters' Laboratories, Inc. Such construction also necessitated a bulky four-wire lead from the heating pad to the switch.

It is an object of the present invention to provide a heating device of the character described in which the foregoing drawbacks are avoided.

More particularly, it is an object of the invention to provide a device of the foregoing character employing but a single heating coil, hereinafter referred to as "the master heating coil," and a single thermostat, which is controlled by auxiliary heaters, the values of whose resistances and that of the master coil are so proportioned that no hot spots are developed in the device.

Another object of the invention is to provide a device of the character described, in which, if an additional thermostat is employed for safety as prescribed by the Underwriters' Laboratories, Inc., said safety thermostat and the thermostat controlled by the auxiliary heaters can be set at the same temperature.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a fragmentary top plan view of a heating pad embodying my invention;

Figs. 2 and 3 are enlarged sectional views taken substantially along the lines 2—2 and 3—3 of Fig. 1;

Fig. 4 is a sectional view taken substantially along the line 4—4 of Fig. 3; and Fig. 5 is a circuit diagram of said pad.

Referring now in detail to the drawings, 10 denotes a heating device such, for example, as a heating pad including upper and lower layers 12, 14 of sheet material suitably secured together, as by cement or stitching, so as to confine therebetween in certain tortuous fashion a master heating coil 16 having a predetermined and uniform ohmic resistance per linear foot. By way of example, this may be 15 ohms per foot.

At some point in the pad, I secure a thermostat 18 between the two fabric layers 12, 14 as by the rectangle of stitching 19. Said thermostat may be of any conventional construction, and in the drawings I have shown the same as including means to adjust the thermostat so that it may be made to open at any desired temperature. The thermostat illustrated comprises a long, narrow panel 20 of insulating material, e. g., a phenolic condensate, to which a bimetallic strip 22 is clamped by a pair of eyelets 24. The eyelets also hold in place over said strip an electrically conductive phosphor bronze leaf spring 25 having a contact 26 at one end thereof. The other end 28 of said spring is connected in circuit by an eyelet 30. Said contact 26 is normally closed against a stationary contact 32 carried at the tip of an adjusting screw 34 threaded into a metallic plate 36 secured by an eyelet 38 to the panel 20. The plate 36 is connected in circuit by an eyelet 40. The working parts of the thermostat are protected by a metallic cover 42 of semi-cylindrical shape having channels 44 along its longitudinal edges to resiliently grip the lateral edges of the panel 20. The ends of said cover are left open to permit circulation of air over the thermostat. It will be appreciated that the thermostat acts to open the contacts 26, 32 when the bimetallic strip 22 under the influence of heat flexes sufficiently to lift the phosphor bronze spring 25. The position of said phosphor bronze spring and, therefore, the temperature at which the contacts will be opened, can be varied by turning the adjusting screw 34.

One end of the thermostat is connected, for example, by the eyelet 40, to one end of the master coil 16 through lead wire 46. The other end of said thermostat is connected by eyelet 30 through lead wires 48, 50 to an auxiliary heater or coil 52. A lead wire 54, running from the lead wire 48, connects another auxiliary heater or coil 56 to the same end of the thermostat 18. The auxiliary heaters 52, 56 lie alongside the thermostat 18, being closely held against the same by a wrapping of friction tape 57.

Pursuant to my invention, both auxiliary heaters have a total resistance which is small compared to the total resistance of the master coil, so that they do not appreciably reduce the current flowing through the device. However, the resistance of the auxiliary heaters per unit length must be greater than that of the master coil. This enables the thermostat to be controlled by the auxiliary heaters, at least at low and medium heats, even if the thermostat is placed in the zone of the pad heated by the master coil. Additionally, the resistances per unit length of the two auxiliary heaters differ from one another for a reason which will later be apparent.

The auxiliary heaters and the master coil may be of any suitable construction, and in the instant case, I have shown the same as comprising an asbestos core C, around which a fine resistance wire W is wound, the same being covered by a tubular asbestos sheath S. The same diameter of wire may be used for all the coils, the pitch of the helical spiral coil varying, however, in the different coils to provide the different values of ohmic resistance per linear foot.

Lead wires 58, 60 connect the ends of the auxiliary heaters 52, 56 remote from the thermostat to a three-way switch 62. This switch may be of any known design, such that it is adapted to be connected at its inlet side to two leads from a source of power, and at its outlet side to either of the two auxiliary heaters or to both of said heaters in parallel. By way of example, said switch may be of the construction shown in my copending application for Electric switches, filed September 10, 1943, under Serial No. 501,768. In this switch, two contacts 64, 66 have the leads 58, 60, respectively, connected thereto. A switch terminal 68 is connected by a lead 70 through a thermostat 72 and a lead 74 to the other end of the master coil 16. Inlet leads 76, 78 are connected to a switch terminal 80 and a switch contact 82, respectively. A jumper 84 permanently connects the switch terminals 68, 80. The three switch contacts 64, 66 and 82 are disposed around the axis of rotation of an electrically conductive disc 86. Said disc has a cut-out sector 88 so arranged that in three of the four quadrantal positions of the disc, said disc will engage only two of the three contacts, and in the fourth position, will engage all three of said contacts.

When the disc engages the contacts 64, 66 but not the contact 82, the heating device will be disconnected from line. When the disc engages only the contacts 64, 82, a circuit will be completed in series through auxiliary heater 52, thermostat 18, master coil 16 and thermostat 72. When the disc is in position to engage only the contacts 66, 82, a series circuit will be completed through auxiliary heater 56, thermostat 18, master coil 16 and thermostat 72. When the disc is in the position shown in Fig. 5 and engages all three switch contacts 54, 56 and 82, current will flow in parallel through the two auxiliary heaters 52, 56 to the eyelet 30, and, from there, in series through the thermostat 18, master coil 16 and thermostat 72. The thermostat 72 is the safety thermostat, required by the Underwriters' Laboratories, Inc., to be responsive to the overall heat of the pad. This thermostat may be of the same construction as the thermostat 18 and is set for high heat.

A heating pad constructed in the foregoing manner operates as follows: When the auxiliary heater 52, having the higher resistance per unit length, alone is connected in series with the master coil and thermostat 18, a maximum of auxiliary heat is generated and, therefore, the intermittent heating periods for the master coil are the shortest, so that the lowest degree of heat is developed by the pad. When the other auxiliary heater 56 alone is connected in series with the master coil and thermostat, less heat is furnished, so that the heating periods of the master coil increase and a medium degree of heat is generated. When both auxiliary heaters are connected in parallel with each other and in series with the master coil and thermostat, said heaters furnish the least heat and the heating periods of the master coil are correspondingly increased to generate a high degree of heat.

It will be noted that the ability of the auxiliary heaters to generate less and less heat, as the effective resistances of said heaters are reduced, is due to the fact that the total resistances of said heaters are small compared to the total resistance of the master coil, so that, despite the fact that the value of the resistance of the effective auxiliary heater changes, the current flowing therethrough remains substantially constant and the heats developed in the auxiliary heaters are, therefore, approximately directly proportional to the values of the resistances.

It also will be observed that when either of the auxiliary heaters alone is connected, it will develop heat at a rate faster than the master coil, since the resistances per unit length of said heaters exceed that of the master coil. This enables me to locate the thermostat at any place in the pad, since said thermostat will be exclusively controlled, at least at low and medium heats, by the greater rates of heat development of the auxiliary heaters.

It is clear that the electric circuit herein described avoids the use of (a) three or more thermostats to control the three heats of a pad, (b) a plurality of master coils, and (c) a four-wire lead. However, unless the resistance values of the master coil and auxiliary heaters are constructed further in accordance with my invention, as later described, a hot spot will be developed in the pad and separate calibration of the two thermostats 18, 72 at different temperatures will be necessary.

This is apparent from the following considerations:

The Underwriters' Laboratories, Inc., specifies that, at high heat, no point in a pad may have a temperature greater than 194° F. Commonly, pads are so constructed that the maximum temperature at high heat ranges from 180° to 185° F. If, at high heat, with the auxiliary heaters in parallel, their resistance per unit length is greater than the resistance per unit length of the master coil, they will generate heat jointly at a linear rate faster than the master coil. As a result, the thermostat 18 controlled by said auxiliary heaters then would have to be set at a temperature higher than that at which it is desired to have the remainder of the pad kept. This high temperature carbonizes the rubber or rubber equivalent which I may use to secure together the several layers of the pad. In addition, such high temperature creates a zone in the pad hotter than permitted by the Underwriters' Laboratories, Inc.

Furthermore, pursuant to requirement of the Underwriters' Laboratories, Inc., the safety thermostat 72 must be set at a temperature not exceeding 194° F., but since the thermostat 18 would have to be set at a temperature above 194° F. the two thermostats would be calibrated at different temperatures.

Pursuant to my invention, I avoid development of hot spots and the use of differently calibrated thermostats by so constructing and arranging the auxiliary heaters and the thermostat 18 that heat is generated by said auxiliary heaters, at high heat, at an areal rate no greater than that at which heat is generated by the master coil. I preferably accomplish such result by proportioning in a certain manner the ohmic resistances of the auxiliary heaters and the master coil. This critical proportioning essentially consists in selecting values for the resistances of said auxiliary heaters, such that when said heaters are connected in parallel they jointly will liberate heat at a rate per unit length not exceeding that at which heat is emitted per unit length of the master coil. If each of the auxiliary resistances is uniform and of approximately the same length, this relationship may also be stated to be such that the resistance per unit length of the auxiliary heaters when connected in parallel is no greater than the resistance per unit length of the master coil. It is to be understood that the term "per unit length" as applied to the auxiliary heaters when connected in parallel is a joint term, i. e., a unit length of the heaters in parallel includes one unit length of each heater. With such arrangement, the two auxiliary heaters, when connected in parallel, will generate heat at a rate per unit length no greater than that of the master coil. These auxiliary heaters will, therefore, never reach a temperature higher than the master coil, and no hot spot will be created at any point in the pad 10.

It will be noticed that, because the master coil and auxiliary heaters heat up at the same rate at high heat, when the thermostat 18 reaches a predetermined temperature—say, 185° F., the major portion of the pad will be at the same temperature. Therefore, the temperature for which the thermostat 18 is calibrated can be the same as that for which the thermostat 72 is calibrated.

Nor will the pad have a hot spot at low or medium heats when heat is generated more rapidly by either one of the auxiliary heaters, since the thermostat 18 is set at 135° F. or thereabouts.

I have found it highly desirable to so apportion the resistances per unit length of the master coil and auxiliary heaters that the resistance per unit length of one of the auxiliary heaters is about the average of the resistance per unit length of the other auxiliary heater and master coil. Since the current remains substantially constant, such selection of values will furnish a pad temperature at medium heat approximately midway between the pad temperatures at low and high heats. The resistance per unit length of said one heater may be slightly closer to the unit linear resistance of the master coil than to the other auxiliary heater in order to compensate for increased radiation and make the medium heat pad temperatures substantially the mean of the low heat and high heat pad temperatures.

I have obtained very satisfactory results where the ratio per unit length of the master coil and auxiliary heaters is in the order of 6:10:15, where six is the value corresponding to the master coil. It will be observed that six is the reciprocal of the sum of the reciprocals of ten and fifteen and that ten is approximately the average of six and fifteen but is slightly closer to six than it is to fifteen.

The following are illustrations of ohmic values and dimensions which will give satisfactory results with a fifteen-foot master coil of fifteen ohms per foot, it being understood that these values are in no manner to be considered limitative. The auxiliary heater 56 is four inches long and has a resistance of eight and one-third ohms. The auxiliary heater 52 is four inches long and has a resistance of twelve and one-half ohms. The ohmic resistance of the master coil for a four-inch length is five ohms. Thus, the auxiliary heater 56 has an ohmic resistance of twenty-five ohms per foot, and the auxiliary heater 52 an ohmic resistance of thirty-seven and one-half ohms per foot.

Since the total two hundred twenty-five ohm resistance of the master coil comprises the bulk of the resistance of the pad, the current flowing through the pad at either high, medium or low heat is for practical purposes controlled by said resistance, so that at all these heats, approximately the same voltage is impressed either across the auxiliary heater 52 when the pad is operating at low heat, the auxiliary heater 56 when the pad is operating at medium heat, or across both auxiliary heaters in parallel when the pad is operating at high heat.

The ohmic resistance per linear foot of the two auxiliary heaters in parallel is the reciprocal of the sum of the reciprocals of the ohmic resistance per linear foot of the two auxiliary heaters. By computation, this is fifteen ohms per foot, or five ohms per four inches. Thus, the ohmic resistance per linear foot of the two auxiliary heaters in parallel is the same as the ohmic resistance per linear foot of the master coil.

It is true that the device will pass a slightly greater current at high heat than at low or medium heat. However, this same current will traverse both the master coil and auxiliary heaters, so that the auxiliary heaters will never generate heat at a linear rate greater than the master coil.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. An electric heating pad including a single master coil, a pair of thermostats in the heated portion of the pad both connected in series with said master coil and one adapted to be controlled by said master coil, a pair of auxiliary heaters in said heated portion for controlling the other thermostat, said auxiliary heaters being so connected that either one may be placed in series with said other thermostat and master coil or both connected in parallel with each other and in series with said other thermostat and master coil, the total resistance of said master coil greatly exceeding the total resistance of either of the auxiliary heaters and the resistance per unit length of each auxiliary heater exceeding the resistance per unit length of the master coil and differing from one another, the resistance per unit length of said auxiliary heaters connected in parallel being no greater than the resistance per unit length of said master coil, both of said thermostats being calibrated to the same temperature.

2. An electric heating pad including a single master coil, a pair of thermostats in the heated portion of the pad both connected in series with said master coil and one adapted to be controlled by said master coil, a pair of auxiliary heaters in said heated portion for controlling the other thermostat, said auxiliary heaters being so connected that either one may be placed in series with said other thermostat and master coil or both connected in parallel with each other and in series with said other thermostat and master coil, the total resistance of said master coil greatly exceeding the total resistance of either of the auxiliary heaters and the resistance per unit length of each auxiliary heater exceeding the resistance per unit length of the master coil and differing from one another, the resistance per unit length of said auxiliary heaters connected in parallel being no greater than the resistance per unit length of said master coil, both of said thermostats being calibrated to the same temperature, one of said auxiliary heaters having a resistance per unit length approximately midway between the resistance per unit length of the other auxiliary heater and the resistance per unit length of the master coil.

DAVID B. MacKENDRICK.

REFERENCES CITED

The following references are of record in the file of this patent:

UNITED STATES PATENTS

| Number | Name | Date |
|---|---|---|
| 1,689,809 | Baughan | Oct. 30, 1928 |
| 2,122,650 | Keene | July 5, 1938 |
| 2,360,084 | Taylor | Oct. 10, 1944 |

FOREIGN PATENTS

| Number | Country | Date |
|---|---|---|
| 448,761 | Germany | Jan. 30, 1927 |